United States Patent [19]

Zumbrunnen

[11] 4,242,175
[45] Dec. 30, 1980

[54] SILICON REFINING PROCESS

[76] Inventor: Allen D. Zumbrunnen, 419 Sherman Ave., Salt Lake City, Utah 84115

[21] Appl. No.: 973,134

[22] Filed: Dec. 26, 1978

[51] Int. Cl.³ .............................................. C30B 11/02
[52] U.S. Cl. ......................... 156/616 R; 156/DIG. 64; 164/55; 164/68; 164/133; 266/217; 422/247
[58] Field of Search ............... 156/616 R, 615, 617 V, 156/619, 624, DIG. 64, DIG. 89; 422/247, 248; 423/348; 261/112; 75/93 E, 65 R; 266/217; 164/55, 68, 133, 259, 335, 337

[56] References Cited

U.S. PATENT DOCUMENTS

| | | | |
|---|---|---|---|
| 1,889,510 | 11/1932 | Amsler | 156/615 |
| 2,734,244 | 2/1956 | Herres | 164/68 |
| 2,866,701 | 12/1958 | Strauss | 75/59 |
| 2,997,384 | 8/1961 | Feichtinger | 266/217 |
| 3,008,887 | 11/1961 | Herglotz | 75/89 |
| 3,086,850 | 4/1963 | Marino, Jr. et al. | 156/619 |
| 3,337,303 | 8/1967 | Lorenzini | 156/619 |
| 3,356,489 | 12/1967 | Feichtinger | 266/217 |
| 4,097,584 | 6/1978 | Reuschel et al. | 423/348 |

FOREIGN PATENT DOCUMENTS 922879  7/1959  United Kingdom ..................... 423/348

*Primary Examiner*—Frank W. Lutter
*Assistant Examiner*—Gregory N. Clements
*Attorney, Agent, or Firm*—Mallinckrodt & Mallinckrodt

[57] ABSTRACT

Metallurgical grade silicon is melted and the resulting impure molten metal is continuously flowed downwardly as a thin film through an atmosphere of impurity-reactive gas or gases directly into a crucible, wherein it is subjected to directional solidification. The preferred apparatus for carrying out the process comprises a heated reaction chamber fed peripherally from a superimposed melting chamber, the reaction chamber having horizontally rippled interior wall surfaces of a substantially non-reactive material, such as graphite, silicon carbide, or silicon nitride, so the descending film of molten metal will be agitated and spread laterally. Means are provided for introducing the reactive gas or gases near the bottom of the reaction chamber and for exhausting the spent gas at the top. The reaction chamber is superimposed above and in vertically spaced relationship with an electric furnace, which encircles a columnar crucible. The reaction chamber has a bottom discharge orifice disposed directly above the open mouth of the crucible, and means are provided for gradually raising the furnace relative to the crucible so solidification of received molten metal progresses gradually from the bottom of the crucible upwardly. Means may be provided for introducing an inert gas, such as argon, into the furnace enclosure to prevent reactive gas from entering the furnace area with the molten metal. In either case, the resulting silicon billet is extracted from the crucible and relatively pure and relatively impure portions are separated therefrom.

8 Claims, 4 Drawing Figures

SILICON REFINING PROCESS

BACKGROUND OF THE INVENTION

1. Field

The invention is in the field of silicon refining and is concerned with a process for producing a high-purity, polycrystaline silicon from the usual metallurgical grade or other impure silicon at relatively low cost for use primarily in photovoltaic (solar) cells.

2. State of the Art

Metallurgical grade silicon metal is produced in quantity commercially by the carbon reduction of silica ($SiO_2$) in an electric arc furnace. The typical purity level is about 98% silicon. When this material is upgraded by refining to the point where total metallic impurities have been reduced to less than approximately 0.01 percent, it becomes a useful feed material for conventional single crystal growth processes and subsequent fabrication into photovoltaic cells.

Aluminum, iron, and calcium values are typically the principal impurities in arc-furnace, i.e. metallurgical grade, silicon. The amounts of these impurities in the silicon are lessened commercially by chemical reaction with gases to produce a low-aluminum grade of silicon widely used in industry.

Chemical reaction with gases produces either volatile compounds which are removed by evaporation, or insoluble compounds which float as a dross on the surface of the silicon metal in its molten state. A reactive gas, usually chlorine, but sometimes others, such as oxygen, carbon dioxide, water vapor, etc. is blown into molten silicon by means of a lance having its discharge end submerged in the melt. When used in the commercial production of metallurgical grade silicon, the gas is normally blown into the melt immediately following tapping of the electric arc furnace and in the refractory-lined ladle into which the tapped molten metal flows.

Some experimental work has been done in carrying chemical reaction further by the use of other gases, followed by some form of directional solidification, such as zone-refining, in attempts to achieve upgrading to the point at which the product can be used as feed material for single crystal growth processes. Yet, none of this has resulted in a commercial process.

Zone refining and other directional solidification techniques are widely used to produce semiconductor grade silicon, and their effectiveness is well known. In directional solidification, a liquid-solid interface is established and gradually moved through a mass of metal. The impurities selectively segregate in the liquid phase. When the mass of metal is completely solidified, the last portion to solidify will contain most of the impurities and is separated from the remainder of the mass as by sawing, leaving a mass of metal having greatly improved purity over the starting material.

3. Objective

A principal objective in the making of the present invention was to produce an intermediate grade of semiconductor silicon at relatively low cost and of sufficient purity to be useful in photovoltaic applications.

SUMMARY OF THE INVENTION

In accomplishing the foregoing objective of the invention, a new and very effective gas purification technique has been combined in a unique way with directional solidification to produce the desired end product.

Thus, in carrying out the invention, impure silicon is continuously flowed downwardly through a heated reaction chamber as a thin film in the presence of a reactive gas or gases and out the bottom of such chamber directly into a columnar crucible wherein it is subjected to directional solidification. The crucible is heated by a surrounding furnace, and vertical movement of one relative to the other or of each to the other provides for bottom and progressively upward cooling of the crucible and its contents.

The reaction vessel defining the reaction chamber and the crucible and furnace are preferably enclosed as an operating unit, the reaction vessel being heated by an electric resistance furnace which surrounds it and being fed with molten metal from a superimposed melting chamber which is itself fed with finely divided, solid, metallurgical grade silicon from a superimposed hopper above the reaction chamber.

An inert gas, such as argon, is preferably injected into the lower part of the apparatus to prevent entry of the reactive gas or gases into the vicinity of the crucible and its surrounding furnace along with the partially refined molten metal from the reaction chamber.

If it is desired to use atomic hydrogen as a reaction gas, a hydrogen dissociator is mounted below the discharge opening of the reaction chamber, so as to direct atomic hydrogen upwardly thereinto, and the apparatus is evacuated during operation.

The resulting silicon metal billet is extracted from the crucible, and relatively pure and impure portions thereof are separated one from another, as by sawing.

Increased purity can be achieved by repeating the refining process. That is, the high purity portion of the ingot is re-crushed to powder and subjected to the same refining procedure a second time. This should be carried out in a second apparatus of the same construction to avoid re-contamination of the metal.

Also, to increase ingot yields during the first melt and to improve overall process efficiency, it may be desirable in some cases to acid leach the silicon starting material in order to remove gross impurities. This widely practiced expedient will improve the purity of metallurgical grade silicon typically from about 98.0 to about 99.5 percent silicon.

Although metallurgical grade silicon is normally used as the feed material in the present process, it should be realized that any impure silicon material containing a somewhat similar low level of impurities can be efficiently refined by the present process.

THE DRAWINGS

The best mode presently contemplated for carrying out the invention is illustrated in the accompanying drawings, in which:

FIG. 1 is a schematic view in vertical axial section through one form of the apparatus of the invention, the material feed mechanism being illustrated partially in elevation and the raised position of the electric furnace that normally surrounds the crucible being indicated by broken lines;

FIG. 2, a view corresponding to that of FIG. 1, but drawn to a larger scale and showing only the upper portion of the apparatus, structural details not illustrated in the schematic shown of FIG. 1 being included here;

FIG. 3, a top plan view of the apparatus of the foregoing Figs.; and

FIG. 4, a schematic view similar to that of FIG. 1 but illustrating an embodiment of apparatus in which atomic hydrogen is employed as the reaction gas.

DETAILED DESCRIPTION OF THE ILLUSTRATED EMBODIMENTS

Although the process of the invention can be carried out in various ways utilizing specifically different forms of apparatus, it is presently preferred to employ the particular embodiments of apparatus illustrated herein.

Figure 3:
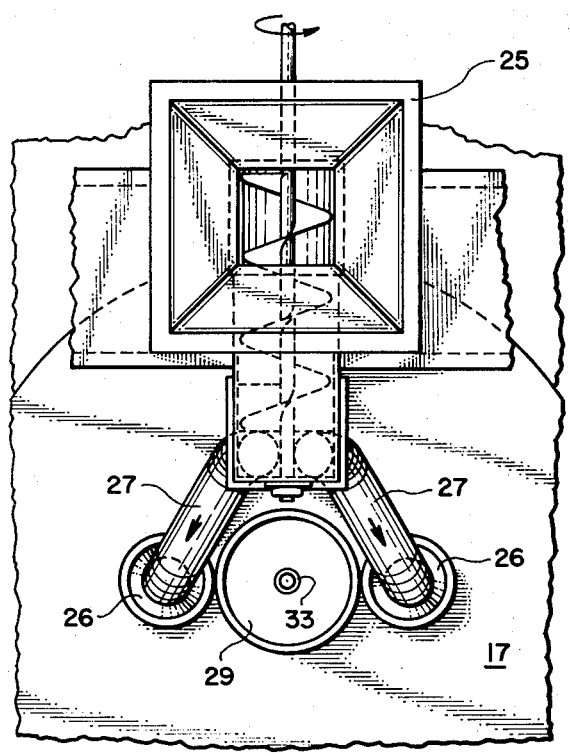
Figure 1:
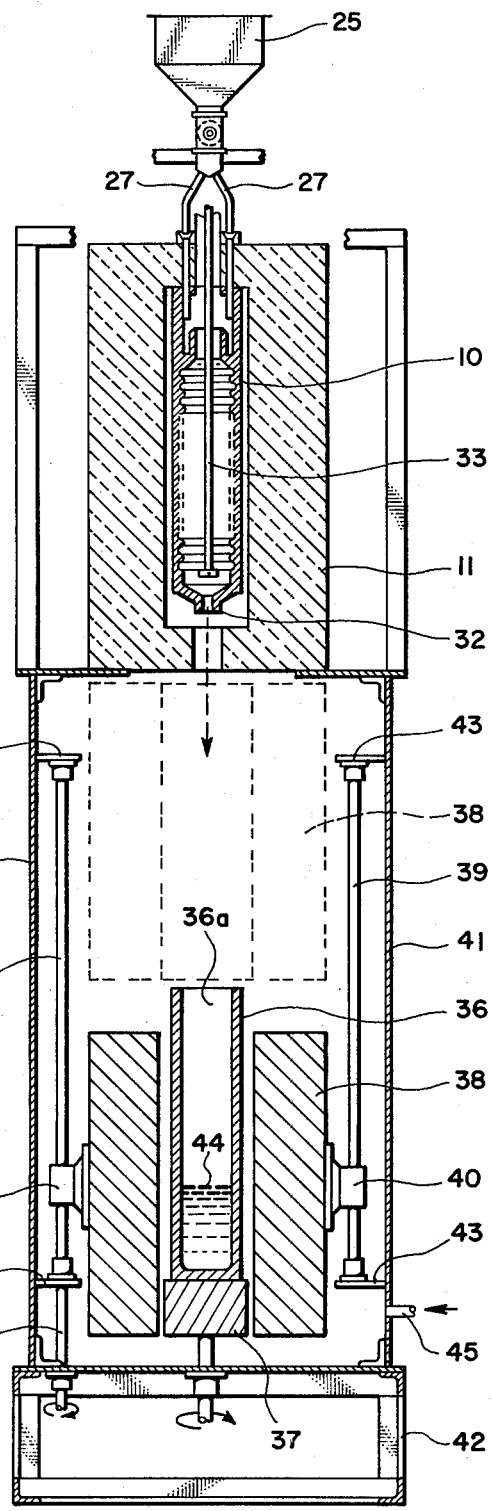
Figure 2:
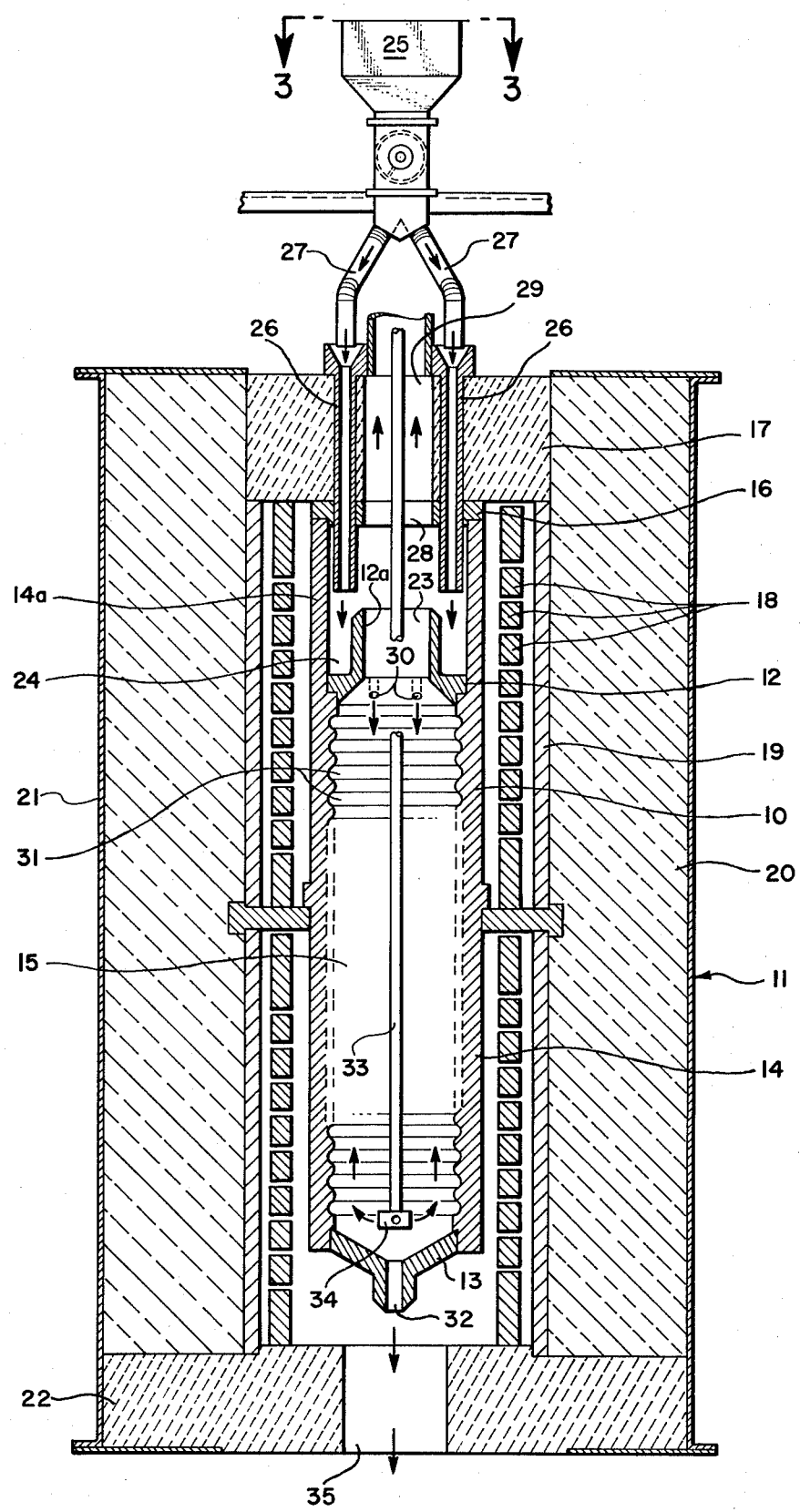

Thus, in the embodiment of FIGS. 1 through 3, molten, impure silicon is flowed downwardly through a reaction vessel 10, which is surrounded by an electric resistance furnace 11. Such reaction vessel 10 is preferably of cylindrical formation, including a top wall 12, FIG. 2, a bottom wall 13, and a cylindrical side wall 14, all of which define an elongate reaction chamber 15. As illustrated, cylindrical side wall 14 extends upwardly at 14a to a connection with a plate 16, which, in turn, is secured to a refractory header 17 forming part of the surrounding, electrical resistance furnace 11.

Furnace 11 may be of conventional construction, being here illustrated only schematically as including heater elements 18 arranged annularly around vessel 10 interiorly of a cylindrical wall 19 backed by heat insulating material 20 within an outer shell 21 and supported by a refractory bottom wall 22.

The impure silicon is preferably supplied to the apparatus in finely divided, solid form as a powder or granules and is melted prior to entry into reaction chamber 15.

In the form illustrated, top wall 12 of reaction vessel 10 is provided with a central opening 23 for the exhaust of reactive gases and with an upstanding annular wall 12a marginal to such opening and defining, with wall portion 14a, an annular melting chamber 24. The finely divided, impure silicon is fed into such melting chamber 24 from a dispensing hopper 25 by means of feed tubes 26. Conduits 27 carry material discharged from hopper 25 into such feed tubes 26 continuously during operation of the apparatus.

An opening 28 centrally of plate 16 is in substantial registry with opening 23 and with the exhaust passage defined by upstanding wall 12a, and opens into a continuing exhaust passage 29 defined centrally in refractory header 17 to provide for the discharge of spent gases from reaction chamber 15 to an appropriate stack or other exhaust system provided by the building in which the apparatus of the invention is located.

Top wall 12 of reaction vessel 10, which serves as the bottom of melting chamber 24, is provided with a series of feed passages 30 leading from melting chamber 24 into reaction chamber 15 peripherally of the interior surface of cylindrical side wall 14 of reaction vessel 10.

It is a feature of the present invention that molten impure silicon is flowed downwardly through the reaction chamber as a thin film, and in the present embodiment of the apparatus of the invention the thin film is formed on the interior wall surface of reaction vessel 10 by diffusion thereover of the molten metal entering reaction chamber 15 through feed passages 30. To facilitate horizontal spread of the molten metal over the interior wall surface defining the reaction chamber, such surface is preferably rippled, as by corrugations 31.

The film of molten metal discharges onto the conical inside surface of bottom 13 of reaction vessel 10 and discharges from reaction chamber 15 as a stream flowing through a discharge orifice 32 provided centrally of such bottom wall 13.

It is preferred that the electrical heating elements 18 of resistance furnace 11 be constructed and arranged so that the upper part of reaction chamber 15 is heated to slightly above the melting point of the impure silicon and so that the lower part of such chamber is heated to a higher temperature such as will increase the evaporation rate of impurities in the molten silicon flowing downwardly through the reaction chamber. Thus, there is a refluxing of the silicon metal, which enhances reaction with a purifying gas or gases introduced into such chamber for the purpose of chemically upgrading the molten silicon metal.

Figure 4:
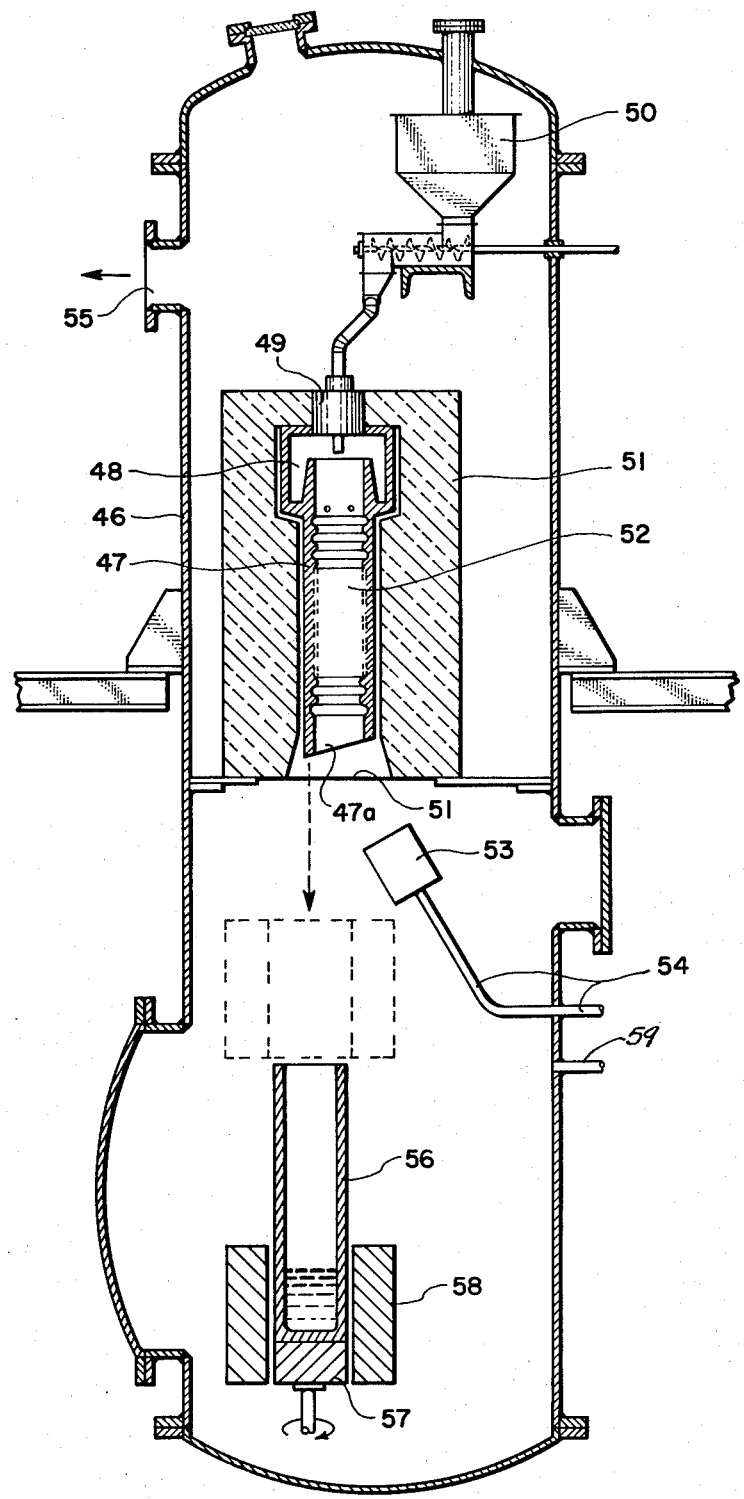

In this form of apparatus, the reactive gas or gases are introduced through a pipe 33 extending axially through the exhaust passages and through reaction chamber 15 to a distributor head 34 adjacent to the bottom of the chamber. Reactive gases for the purpose are well known. The most commonly employed is chlorine, but others such as oxygen, carbon dioxide, water vapor, etc. may be utilized. Atomic hydrogen is especially advantageous, but can be used only immediately following production from molecular hydrogen and usually requires evacuation of the apparatus. The embodiment of apparatus shown in FIG. 4 is used when atomic hydrogen is employed as the reactive gas.

The treated molten silicon metal flowing from reaction chamber 15 through discharge orifice 32 is discharged directly through an opening 35 formed centrally in refractory bottom wall 22 fo furnace 11 into a columnar crucible 36. Such crucible 36 rests on a rotary table 37, which forms the bottom of a seconc electrical resistance furnace 38. Crucible 36 is initially surrounded by furnace 38, but such furnace, except for its bottom 37, is adapted to be raised progressively during the course of operation of the apparatus. For this purpose, the upstanding cylindrical wall of furnace 38 is mounted on posts 39 by means of sleeves 40. One of such posts, 39a, is externally threaded and adapted to be rotated by suitable means (not shown) coupled to a downward extension 39b of such threaded post. The sleeve, 40a, encircling threaded post 39a is internally threaded for mating with the external threads of post 39a, so that rotation of such post in one direction will lift furnace wall 38 relative to crucible 36, whereas rotation in the opposite direction will return such furnace wall to its original lowered position. The other post, 39, and the other sleeves, 40, are unthreaded so that such sleeves slide upwardly and downwardly on such posts during raising and lowering of the furnace.

The furnace and crucible are enclosed by walls 41 erected on box base 42 and, in turn, serving to support posts 39 and 39a by means of brackets 43 as illustrated. Upper furnace 11 is mounted on top of and is supported by walls 41 as superstructure therefor.

In operation, as the treated molten silicon metal flows into crucible 36 through its open mouth 36a and accumulates as a pool 44 in the crucible, furnace 38 is raised progressively to ultimately reach the position indicated by dotted lines in FIG. 1, free and clear of crucible 36. Accordingly, pool 44 of molten metal will cool progressively from the bottom upwardly as the furnace is progressively raised so as to leave lower portions of the crucible exposed to the ambient atmosphere within the furnace enclosure. This constitutes the directional solidification, i.e. zone refining, phase of the process.

When crucible 36 is filled to the desired extent and the silicon metal contained therein has solidified, the filled crucible is removed from the apparatus through a suitable access door (not shown), and the solidified billet of metal is removed from the crucible in any suitable manner. For example, the crucible may be made of an expendable refractory material and broken in order to free the solidified metal billet. The resulting metal billet is then divided transversely as by sawing, into sections of relatively impure metal and relatively pure metal, the latter being the desired product of the process.

In order to prevent back flow of corrosive reactive gases from reaction chamber 15 into the lower part of the apparatus along with the molten metal discharged thereinto, it is desirable that an inert gas, such as argon, be introduced into the enclosure surrounding lower furnace 38, as, for example, through an inlet 45 from a source of such gas under a pressure that will substantially balance the pressure within reaction chamber 15.

In those instances in which it is desired to employ atomic hydrogen as the reactive gas, the apparatus of FIG. 4 is utilized. Such apparatus corresponds in many respects with the apparatus described above, but includes an external housing 46 which is air tight so that it may be evacuated during operation.

As illustrated, a reaction vessel 47 has its upper end surrounded by a melting chamber 48 for finely divided impure silicon supplied by feeding means 49, which, in turn, is supplied continuously from a hopper 50.

Reaction vessel 47 is surrounded by an upper electrical resistance furnace 51, and both such reaction vessel and such furnace have their bottoms open, as at 47a and 51a, for the inflow to reaction chamber 52 of atomic hydrogen discharged from an atomic hydrogen generator 53. As is indicated at 54, molecular hydrogen is supplied to generator 53 from any suitable source of same.

Evacuation of housing 46 is accomplished by applying suction, from a vacuum pump for example, through port 55.

As shown, the lower end of reaction vessel 47 defining discharge opening 47a is biased so discharge will occur at the lower side thereof directly into crucible 56, which is offset in position relative to reaction vessel 47 for the purpose.

Crucible 56 rests on a rotary bottom portion 57 of an electric resistance furnace 58, as in the previous embodiment, which furnace is mounted (not shown) for up and down movement relative to crucible 56, as in the previous embodiment, to effect directional solidification or zone cooling. The resulting billet of solidified molten metal is freed from the crucible and divided into relatively pure and impure sections, again as in the previous embodiment.

In some instances, it may be desirable to use with the atomic hydrogen one or more other reactive gases of the type mentioned in connection with the embodiment of FIGS. 1–3. In such instances, the other gas or gases are supplied from any suitable source of same by way of a conduit 59 provided for that purpose.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A silicon refining process, comprising continuously flowing molten, impure silicon downwardly through a reaction chamber as a thin film; contacting said film with an impurity-reactive gas or gases as the molten metal flows through the reaction chamber; discharging the thus treated molten metal from the bottom of the reaction chamber directly into a columnar crucible; subjecting the molten metal in the crucible to directional solidification; extracting the resulting solid silion billet from the crucible; and separating relatively pure and relatively impure portions of said silicon billet one from another.

2. A silicon refining process according to claim 1, wherein the thin film is agitated and spread substantially horizontally as it descends through the reaction chamber.

3. A silicon refining process according to claim 1, wherein atomic hydrogen is the reactive gas by which the metal film is contacted in the reaction chamber.

4. A silicon refining process according to claim 3, wherein the reaction chamber is surrounded by an evacuated area and the atomic hydrogen is produced immediately below the bottom of the reaction chamber so as to flow upwardly into and through the reaction chamber.

5. A silicon refining process according to claim 1, wherein a furnace surrounds the crucible below the reaction chamber; and directional solidification is achieved by relative vertical movement between furnace and crucible.

6. A silicon refining process according to claim 1, wherein the silicon is finely divided, solid form is melted above the reaction chamber and is flowed into said chamber peripherally thereof.

7. A silicon refining process according to claim 1, wherein the reaction chamber is heated differentially as the molten silicon metal is flowed downwardly therethrough, heating of the upper part of said chamber being such as to maintain the temperature therein only slightly above the melting temperature of said metal, and heating of the lower part of said chamber being such as to maintain the temperature therein at an elevated supertemperature such as will increase the rate of volatilization of impurities in said metal.

8. A silicon refining process according to claim 1, wherein the crucible is rotated relative to the furnace to achieve a stirring action of molten metal therein.

* * * * *